J. N. BRIGGS.
APPARATUS FOR PLANING CAKES OF ICE.
No. 11,566. Reissued Sept. 8, 1896.
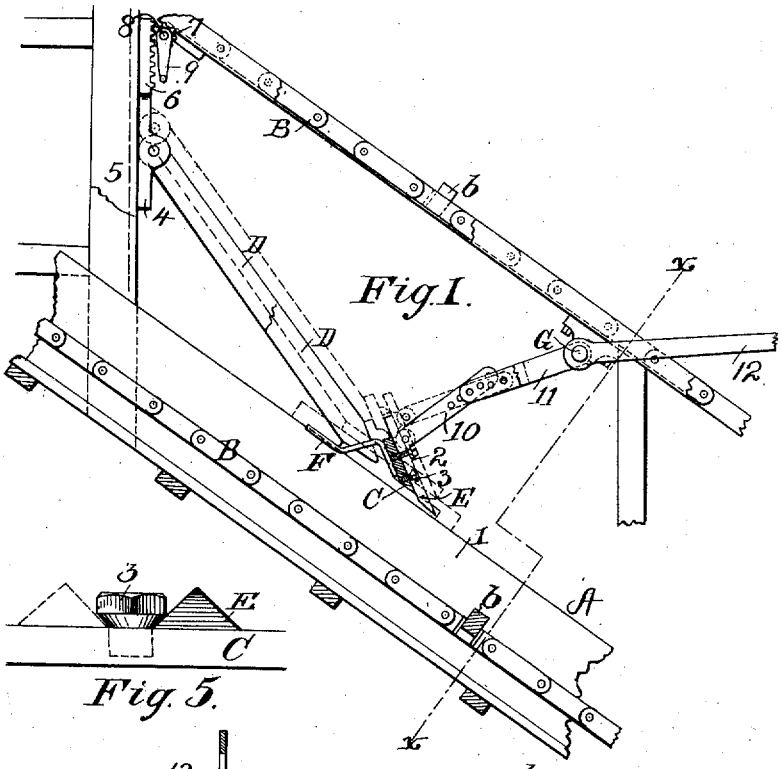
Fig. 5.
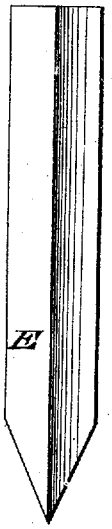
Fig. 4.
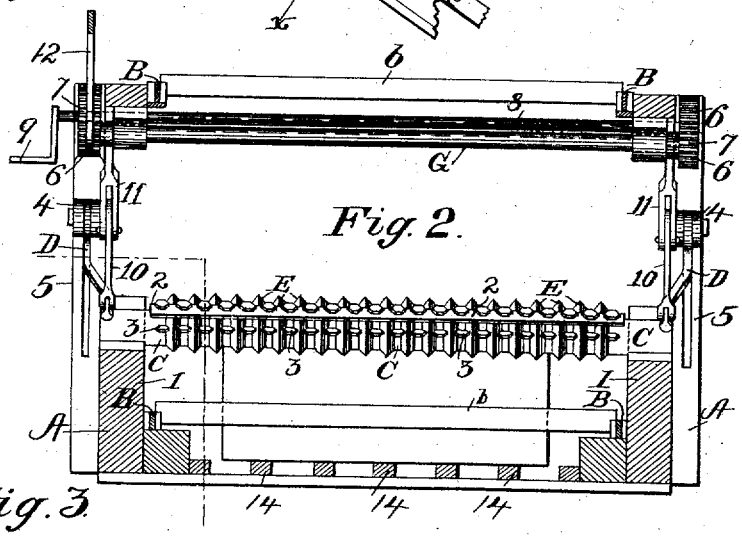
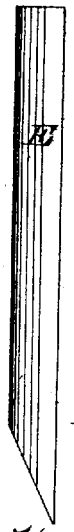
Fig. 3.
Witnesses.
N. R. Edelen.
Geo. Lewis
Inventor.
John N. Briggs
by Pollok & Mann
his attorneys.

UNITED STATES PATENT OFFICE.

JOHN N. BRIGGS, OF COEYMANS, NEW YORK.

APPARATUS FOR PLANING CAKES OF ICE.

SPECIFICATION forming part of Reissued Letters Patent No. 11,566, dated September 8, 1896.

Original No. 346,576, dated August 3, 1886. Reissue No. 11,060, dated February 18, 1890. Application for present reissue filed July 6, 1896. Serial No. 599,450.

*To all whom it may concern:*

Be it known that I, JOHN N. BRIGGS, of Coeymans, in the county of Albany and State of New York, have invented new and useful Improvements in Apparatus for Planing Cakes of Ice for Storing, of which the following is a specification.

Much difficulty has heretofore been experienced in properly storing ice for use in warm weather, by reason of the unequal thicknesses of the different cakes of ice, whereby an uneven and broken surface of the upper layer of the mass was produced, which greatly interfered with the sliding of the cakes over the surface and involved excessive labor and expense in the proper storage of the ice. To remedy this difficulty recourse has commonly been had to chipping off the upper surface of the ice after each layer has been placed in the house. This, while it partially remedied one trouble at a great cost, produced another as great by reason of the chips of ice falling into and filling up the vertical spaces formed around adjoining cakes for the purpose of drainage and to facilitate the removal of the cakes from the mass.

The object of my invention is to remedy this difficulty, to provide facilities for the more effectual drainage of the water produced by the melting away of the ice, to afford a more certain foothold for the workmen employed in storing the ice, and to facilitate the separation of the cakes in summer.

Heretofore a machine has been devised, as shown in the United States Patent No. 271,220, of January 30, 1883, for planing and grooving blocks of ice, in which machine blocks were to be drawn under the mechanism for planing and grooving. In said machine, however, cutting and grooving devices are independent of each other and act successively, the cutters and planers acting first and afterward the grooving devices. In my machine, hereinafter explained, I have combined cutting and grooving devices into one instrument, and I have also so arranged these devices in relation to each other that the grooving devices are in advance of that part which cuts horizontally or planes the upper surface of the block of ice, whereby the work is performed with less power. In the description of the cutting and grooving devices hereinafter given I have called that part which performs the cutting a "cutter-head." As hereinafter shown, it is that part to which the teeth are fixed which form the grooves. This cutter-head, with the teeth, is set inclined, and its forwrad part is formed with an edge. Preferably said teeth are set apart so that the forward edge of the cutter-head between the teeth will be exposed, and acts to plane down the ridges to a certain extent, which are formed by the teeth set in advance of said edge, and by reason of the inclination and forward and downward projection of these teeth into the ice the machine operates.

In the accompanying drawings, which are herein referred to and form part of this specification, Figure 1 is a side elevation of my reducing apparatus applied to an ice-house elevator; Fig. 2, a transverse section of the same at the line X X; and Figs. 3, 4, and 5 are respectively a detached and enlarged side elevation, front elevation, and end elevation of a preferred form of chisel for the cutter-head of my reducing apparatus.

As illustrated in the drawings, A represents an inclined elevator or railway commonly used for raising the ice into the ice-houses, a small portion of the same only being shown; B, the endless chain, provided with cross-bars *b* for moving the cakes of ice up the inclined railway. The said chain may be operated by steam or any suitable motive power.

The said parts, being common and well known, do not constitute any part of my invention, which consists of the following parts: C is the cutter-head, secured to the free ends of the side links D and bearing on each of the lower string-pieces 1 of the inclined railway, so as to extend entirely across the latter, and it has an edge formed by a bevel on its under surface on the forward margin, as shown in the cross-section of Fig. 1. The upper face of said cutter-head, which is a straight bar or plate, is fixed at an acute angle to the inclination of the string-pieces 1, and upon it are secured a series of chisels or cutter-teeth E. The latter are preferably made in the triangular prismatic form shown in Figs. 3, 4, and 5, with the lower end formed in a sharp point. These are arranged with their cutting-points ranged on a straight line, or nearly so, that will be parallel with the forward edge of the cutter-head and so as to leave a clear space between the several cutters, which space is occupied by the sharp edge of the cutter-head, as shown in Fig. 2, and by this means grooves are formed in the ice with a slightly greater depth at the center line of each, said grooves being separated by a ridge equal in width to the width of the space between the teeth. At the same time the exposed edge of the cutter-bar removes the upper part of the ridges and leaves them at a uniform height. These cutter-teeth are held in place at their upper ends by a cross-bar 2, which passes over all the teeth, and at their lower ends by conical-headed tap-bolts 3, which are inserted in the spaces between the teeth. Springs F are secured to the under side of the cutter-head C to prevent the cake of ice which is being planed from being thrown up by the action of the cutter-teeth.

The links D are pivoted to the boxes 4, which are placed at a sufficient height from the string-pieces 1 to bring the links D at an acute angle to the inclination of said string-pieces, and by this arrangement the force applied to the ice to effect the planing will tend to press the cutter-head down firmly upon the top of the string-pieces 1. The boxes 4 are adjustably fixed to the studs 5, and are provided with racks 6, which engage with pinions 7, secured to a cross-shaft 8, that is operated by a crank 9, so that by turning the shaft 8 the pivotal points of the links D can be readily raised or lowered as occasion may require. For the purpose of raising and lowering the cutter-head C the latter is connected by adjustable rods 10 to arms 11, fixed to the cross-shaft G, which is operated by the hand-lever 12. The arms 11 and rods 10 form toggle-joints to hold the cutter-head C down to its work, and the normal position of said cutter-head is usually where it will bear upon the upper side of the string-pieces 1, but in dressing ice to a greater thickness than that produced by the cutter-head bearing on the string-pieces 1 the boxes 4 can be raised up and the cutter-head C correspondingly blocked up, as indicated by the dotted lines in Fig. 1, the adjustability of the rods 10 permitting such changes to be made.

The operation of my apparatus is as follows: The cakes of ice are placed on the elevator A so that a cross-bar *b* of the constantly-moving endless chain B will engage against the rearmost edge of the cake, and so that the latter will be in condition to slide upon the ribbons 14 of the elevator. As the cake of ice is brought in contact with the cutter-head, the sharp points of the cutter-teeth E will penetrate the ice at the required height from the bottom of the cake and remove any excess of the thickness, the line of fracture following the line formed by the wide base of the cutter-teeth, while the pointed ends of the cutter-teeth penetrate deeper into the cake and form the grooves in the upper surface of the cake, as hereinbefore described. This action is continued until the cake of ice has been subjected to the action of the cutter-teeth over its entire length, and the finished cakes are then carried by the motion of the endless chain to the point of delivery, from whence they are removed and stored in the ice-house. The cakes of ice are stored in the ice-house in layers with the grooved surface uppermost, so that the bottom surface of the successive layers will rest on the ridges of the grooved surface of the cakes in the next layer below, and it will readily be seen that the grooves in the upper surface of the cakes will form perfect channel-ways to carry off the drainage-water from each layer into the vertical spaces which are always left between the blocks of ice.

The corrugated upper surface of each layer, while it does not interfere with the easy sliding of the cakes upon the surface of each layer, will afford a stable footing for the workman, so that he can perform his work to better advantage.

When preferred, the cutter-head C may be provided with cutter-teeth of a different form from those shown in the drawings. As, for instance, a series of flat chisel-pointed cutters or of any other preferred form may be substituted, and such cutters may be spaced apart or fixed close together side by side, and, when preferred, the cutter-head C, provided with cutter-teeth E, may be rigidly bolted in position on the string-pieces 1, and in such cases the means herein described for adjusting said cutter-head may be dispensed with.

By providing the cutter-head with narrow cutter-teeth I facilitate the repairing of the cutting mechanism, for the reason that only the space injured needs to be repaired, whereas, by use of the wide cutter commonly used, when an injury is done at one part of the cutter the entire cutter-edge must be ground to remedy the injury.

I claim as my invention—

1. In an ice-planer for planing cakes of ice for storing, the combination of the cutter-head and cutter-teeth thereon set in an inclined position, said cutter-teeth being pointed and having divergent cutting edges, and an ice-elevator adapted to positively force the ascending cakes of ice into contact with said cutter-teeth in such a manner as not only to cut but to groove the ice at one operation, substantially as described.

2. In an ice-planer for planing cakes of ice for storing, the combination of the cutter-head and cutter-teeth thereon set in an inclined position, said cutter-teeth being pointed and having divergent cutting edges, an ice-elevator adapted to positively force the ascending cakes of ice into contact with said cutter-teeth in such a manner as not only to cut but to groove the ice at one operation, and means whereby the cutter-head can be moved up and down at the will of the operator, receiving a positive motion in both directions, substantially as described.

3. In an ice-planer, a cutter-head arranged above the string-pieces of an ice elevator or railway and inclined thereto, and independently-movable teeth on said cutter-head set in advance of and in the plane of the forward edge of the latter, the parts being combined and operating substantially as described.

4. In an ice-planer and in combination, the cutter-head and independently-removable teeth thereon, set in an inclined position, said cutter-teeth being pointed and having divergent cutting edges, substantially as described.

5. In an ice-planer, a cutter-head having a forward cutting edge, said head being arranged above the string-pieces of an ice elevator or railway and inclined thereto, independently-removable and pointed teeth on said cutter-head set in advance of the forward edge of the cutter-head, a part of said edge of the cutter-head being exposed between the teeth, substantially as described.

6. In an ice-planer, a cutter-head having a forward cutting edge, said head being arranged above the string-pieces of an ice elevator or railway and inclined thereto, independently-removable teeth of triangular prismatic form beveled to a point on said cutter-head set in advance of the forward edge of the cutter-head, a part of said edge of the cutter-head being exposed between the teeth, substantially as described.

7. In an ice-planer, a cutter-head arranged above the string-pieces on which the blocks of ice are moved, whereby the ice is planed, and teeth set in advance of the cutting edge of said cutter-head and arranged with spaces between the teeth for the edge of the cutter-head to operate, whereby the surface of the ice is first grooved and then planed, substantially as described.

8. The combination of an ice-elevator, a cutter-head that is pivoted at its rearmost edge to the framework of said elevator by means of links which are rigidly attached to said cutter-head, and which are arranged at an acute angle to the inclination of said elevator, and a cross-shaft G, provided with arms 11 and rods 10 for connecting said arms with the cutter-head, said arms and rods forming toggle-joints, as and for the purpose specified.

9. The inclined railway A and endless chain B of an ice-elevator, in combination with a cutter-head C, which is connected to said elevator by means of links D, which are pivoted to the boxes which are provided with racks, said racks being adapted to engage with pinions on the cross-shaft 8, as and for the purpose specified.

10. The combination, with an ice-elevator, of a cutter-head held in a fixed unyielding position during the operation of planing cakes of ice, and the springs F, fixed to the rearmost side of said cutter-head and adapted to bear upon said cakes of ice and prevent them from being displaced during the said operation of planing, substantially as described.

JOHN N. BRIGGS.

Witnesses:
H. B. CARHART,
W. B. HOLMES.